No. 748,476. PATENTED DEC. 29, 1903.
H. BRYCE.
MACHINE FOR SHAPING AND TRIMMING PIECES OF FABRICS.
APPLICATION FILED OCT. 19, 1901.
NO MODEL. 3 SHEETS—SHEET 1.
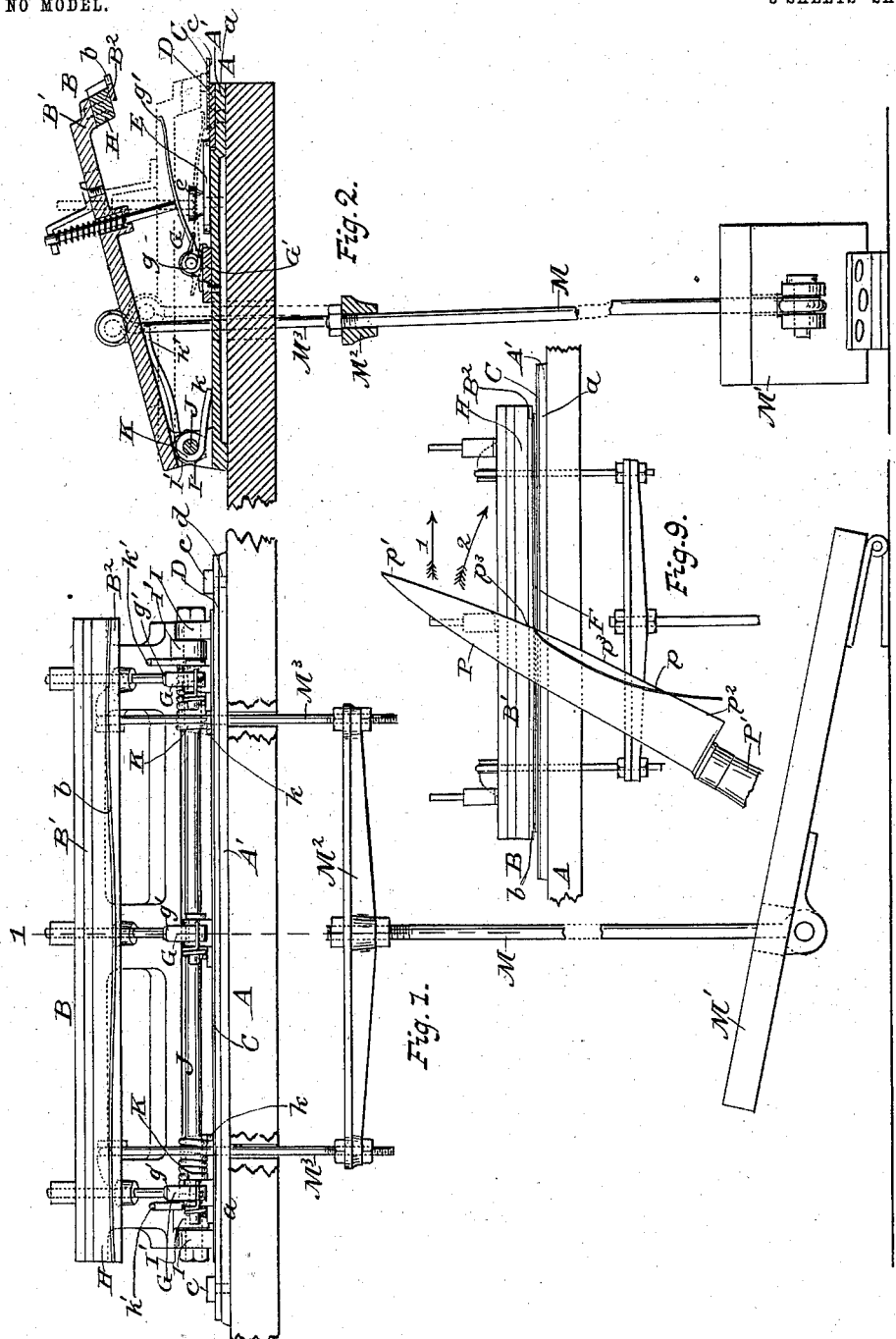
Witnesses.
Henry Bryce,
Inventor,
by Alex. Selkirk
Attorney No. 748,476. PATENTED DEC. 29, 1903.
H. BRYCE.
MACHINE FOR SHAPING AND TRIMMING PIECES OF FABRICS.
APPLICATION FILED OCT. 19, 1901.
NO MODEL. 3 SHEETS—SHEET 2.

Witnesses,
Charles Irving
H. Selkirk

Henry Bryce,
Inventor,
by Alex. Selkirk
Attorney.

No. 748,476. PATENTED DEC. 29, 1903.
H. BRYCE.
MACHINE FOR SHAPING AND TRIMMING PIECES OF FABRICS.
APPLICATION FILED OCT. 19, 1901.
NO MODEL. 3 SHEETS—SHEET 3.
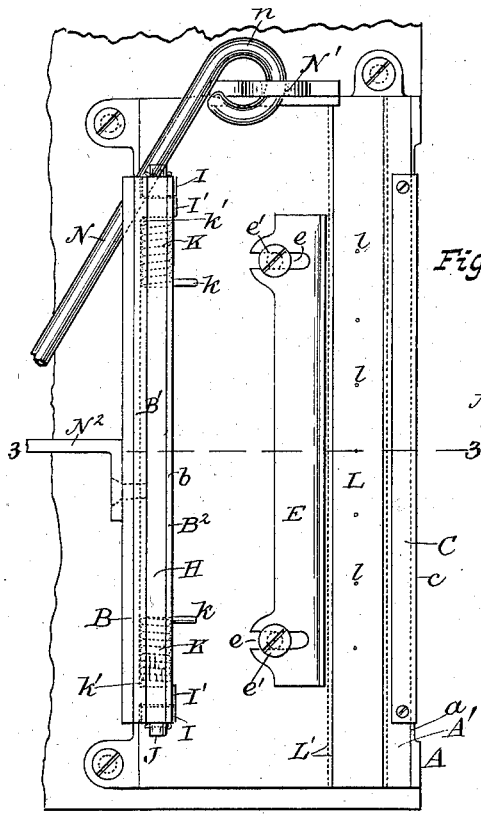
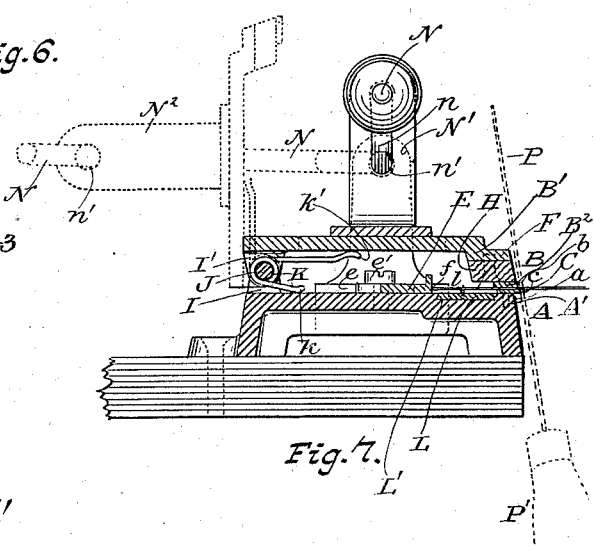
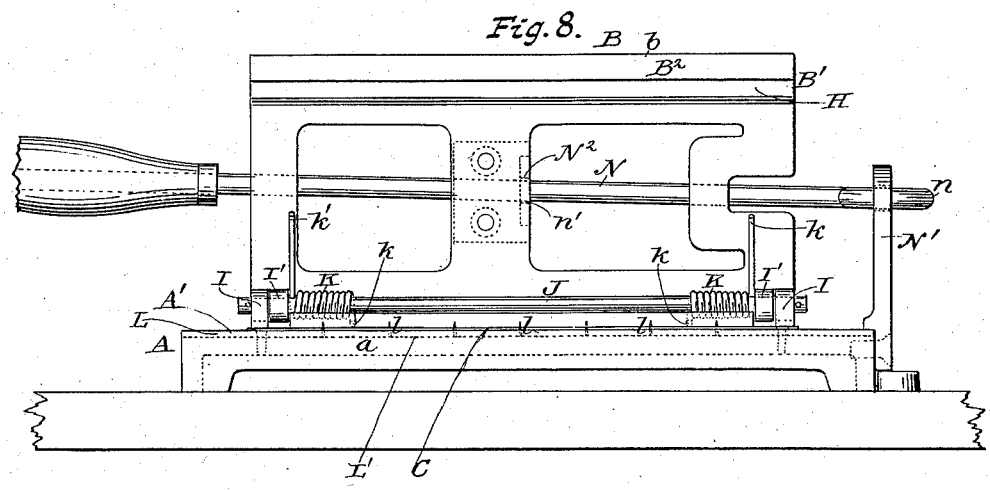
Witnesses,
Henry Bryce,
Inventor,
by Alex. Selkirk
Attorney, No. 748,476. Patented December 29, 1903.

UNITED STATES PATENT OFFICE.

HENRY BRYCE, OF TROY, NEW YORK.

MACHINE FOR SHAPING AND TRIMMING PIECES OF FABRICS.

SPECIFICATION forming part of Letters Patent No. 748,476, dated December 29, 1903.

Application filed October 19, 1901. Serial No. 79,254. (No model.)

*To all whom it may concern:*

Be it known that I, HENRY BRYCE, a citizen of the United States, residing at Troy, in the county of Rensselaer and State of New York, have invented new and useful Improvements in Machines for Shaping and Trimming Pieces of Fabrics, of which the following is a specification.

My invention relates to mechanisms for shaping and for trimming pieces of fabrics either preparatory to being stitched or joined to other pieces or after they have been in part shaped and stitched; and it consists of certain novel features of construction and combinations and arrangements of parts and devices herein shown and described, and more particularly pointed out in the claims.

The objects and advantages of the invention will be fully understood from the following description and claims when taken in connection with annexed drawings, in three sheets, in which—

Figure 3:
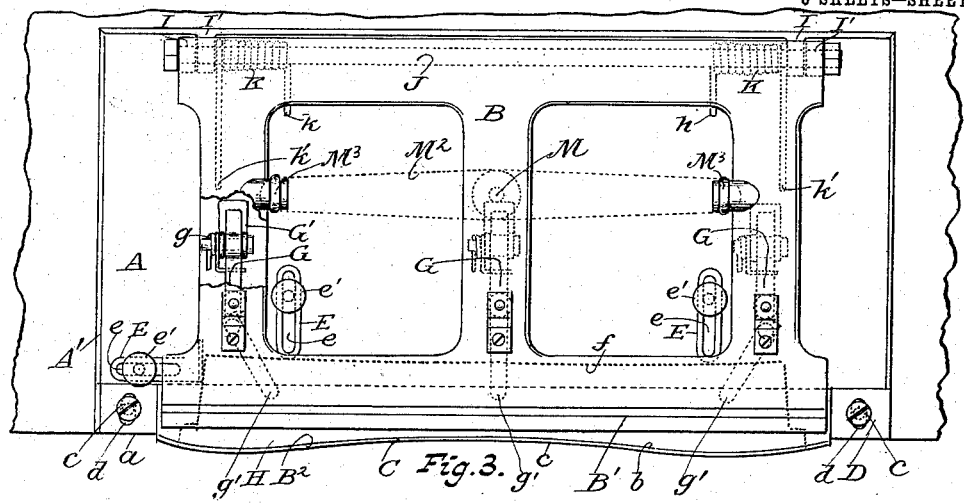
Figure 4:
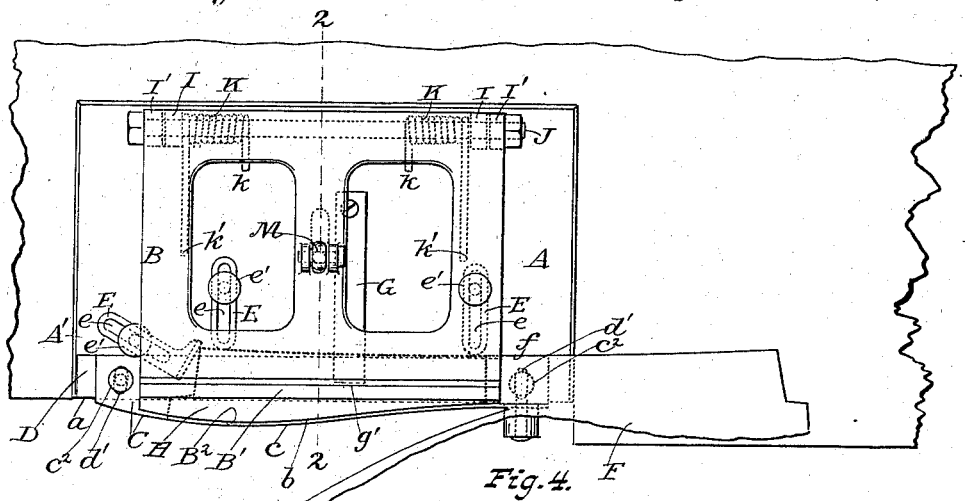
Figure 5:
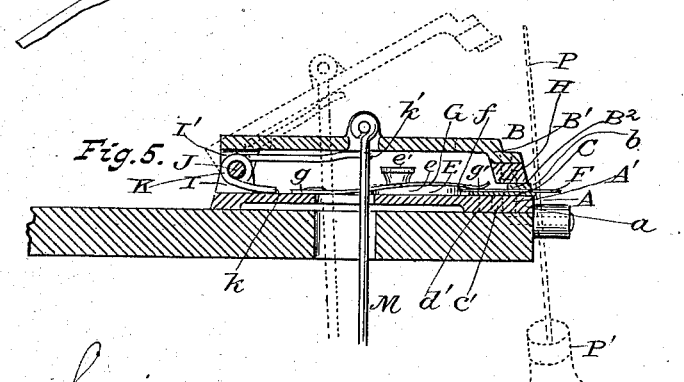

Figure 1 is a front elevation of a fabric shaping and trimming machine embodying my invention. Fig. 2 is a section taken at line 1 in Fig. 1. Fig. 3 is a plan of the same. Fig. 4 is a plan of a machine embodying the invention and showing modifications of parts thereof. Fig. 5 is a section taken at line 2 in Fig. 4. Fig. 6 is a plan of a machine embodying the invention and having modified parts. Fig. 7 is a transverse section with upper half portion indicated by dotted lines and thrown up. Fig. 8 is a front view with upper part turned back, and Fig. 9 is a front view showing the machine clamping the fabric and illustrating the operation of the hand-knife employed with this machine for effecting a cutting of the fabric.

Similar letters of reference refer to similar parts throughout the several views.

The drawings illustrate machines which are in their essential parts of similar construction for operation with fabrics and pieces to be shaped or trimmed and also illustrates modifications of some of the parts which may be employed with the same advantageous results as parts of different construction also shown.

This machine comprises two parts—one, the lower part, consisting of a suitable stationary fabric-clamping part A, provided with suitable gages and a shaping-blade, and the other movable fabric-clamping part B—which two parts are suitably joined to adapt the latter to be readily operated at pleasure to effect a clamping of the fabric while being operated with by a knife operated by the operator and for release of the fabric for its removal and replacement. The stationary fabric-clamping part A consists of the bed-plate A', made of suitable material and with form and proportions adapting it for use with the fabric or pieces to be shaped or trimmed and for adapting it to receive necessary gages, shaping-blade, and other adjuncts which may be advantageously employed.

C is the fabric-shaping blade, which is suitably secured to the upper side of the front edge margin $a$ of the bed-plate A'. Although this shaping-blade C may be secured to said front edge margin $a$ with its body flat on the upper side of the same, as shown in Figs. 5 and 7, yet preference is had for use of an adjustable strip-form blade-retainer D, Figs. 1, 2, and 3, to which said shaping-blade is shown to be placed and secured. This blade-retainer is provided with suitable oblong perforations $d\ d$ and is secured to edge margin $a$ of the bed-plate by suitable clamping-screws $c$, passing through said perforations and screwing in screw-threaded perforations provided in said edge margins $a$, as indicated by dotted lines in Fig. 1. In Fig. 5 the shaping-blade is shown to be placed directly on the upper side of the edge margin $a$ of the said bed-plate, and in Fig. 4 this blade (shown in Fig. 5) is shown to be provided with oblong perforations $d'$ and held in place by clamping screws or bolts $c^2$, so that said blade may be adjusted at pleasure in direction of its width as may be required from time to time as the wear of the fabric-shaping edge $c$ becomes worn and the same as said edge $c$ may be when the blade is secured to the blade-retainer D. Suitable gaging devices E are employed in connection with said shaping edge $c$ of the blade C for gaging the distance or points from said shaping edge $c$. The rear edge $f$ of fabric or piece F is to be extended rearward for giving the body of piece F its required width when shaped or trimmed. In Figs. 6, 7, and 8 but one continuous gaging device is shown to be employed, as it may be when the said shaping-blade C is provided with a straight line of shaping edge c; but when the shaping edge c is made with curved line, as shown in Figs. 3 and 4, I prefer to employ three adjustable gaging devices E—one for gaging the point at which an end of the piece F is to be set and the others for gaging the points which said piece F is to have its rear side edge f extended from the shaping edge c of the blade C. These gaging devices are preferably made to be adjustable, and for that purpose they are provided each with an oblong slot e and are held in place and position adjusted to by suitable clamping bolt or screw e'. Elastic retainers G (one or more) are provided with this bed-plate A for preventing the piece F to be shaped from shifting in direction from the gage or gages E after being placed thereto and before the movable clamping part B is made to coact with the stationary part A. These elastic retainers are made of thin elastic pieces of metal with a convex form of body and of suitable length and width and secured by their rear ends g to the bed-plate A, while their forward end portions g' are extended forward toward the shaping edge c of blade C to a point which adapts said end portion g' to have bearing on the body of the fabric or piece F at a suitable distance rearward of said shaping edge of said blade. In some cases, as in machines for use for operating with fabrics or pieces of long and short lengths, the said elastic retainers are preferably made to be adjustable by having their rear end portions pivoted on suitable pivot-blocks G', Figs. 2 and 3, secured to bed-plate A, so as to adapt said retainers to be turned to the right or left to any preferred distance as may be required for having bearing on the fabric or piece F. In cases where the machine is designed to be employed for clamping and shaping or trimming pieces comprising several plys of fabric I prefer to throw the retainers G into action for holding the bodies of said pieces from shifting by pressure exerted downward on the said retainers by force applied by the operator at pleasure through a suitable draw-rod adapted to be operated by foot, as illustrated in Fig. 2, when such retainer may be readily moved from a raised position (shown by full lines in Fig. 2) to that of dotted lines to have bearing by its forward end portion g' on the piece to be trimmed or shaped. In Fig. 5 the retainer is shown to be adapted to have bearing on the fabric solely from the elasticity of the material of the body of the retainer, and the fabric is introduced to beneath its forward end portion g' by being slid on the shaping-blade back to beneath the said end portion.

The movable clamping part B of this machine consists of the top plate B' and the flexible clamping-piece B², suitably connected with the forward edge margin of said top plate from its lower side by being secured directly thereto, (not shown,) yet I prefer to secure this flexible clamping-piece to said plate by means of a suitable strip-form piece H, of wood or soft metal or alloy, as copper or soft brass, and preferably by cementing the flexible piece B² to said piece H by any suitable cement adapted to hold the substance of said clamping-piece to the material of piece H, while the piece H itself may be secured to the front margin portion of top plate B' by suitable screws. The substance of this flexible clamping-piece B² may be cloth, felt, cork, or other material adapted to yield under pressure and have bearing on the fabric without liability of injuring the same, yet I prefer to make said piece of rubber. This movable clamping part B of the machine is suitably connected to the stationary part A so as to adapt the former to be readily raised and be moved up or back from the latter and be so held until it is closed down on part A by the operator. I prefer to convert part B to part A by means of suitable hinge-knuckles I I, connected with the stationary part A, and knuckles I' I', connected with the movable part B at the rear side of the machine, and pivot said knuckles I I' on shaft J, passing through both pairs of said knuckles, as shown. This movable part B may be elevated and raised up from out a clamping position with the stationary part A by any suitable means, yet I at present prefer to employ with said two parts A and B and with shaft J, holding, as a pivot, the rear portions of said two parts hinged together, spiral tension-springs K, (one or more,) mounted on said shaft and having each an arm k integral with one end of the spring and bearing on the upper side of the bed-plate A' and also having arm k' integral with the opposite end of the same and bearing against the under side of the top plate B', as shown in Figs. 2, 5, and 7. In machines designed for shaping and trimming fabrics and pieces of single ply and light and thin, as lace, chiffon, lawn, mousseline de soie, and light silk, &c., which are apt to be readily drawn out of shape when unevenly pulled on, I provide at near a single continuous gage, as gaging device E in Figs. 6, 7, and 8, a row of upwardly-projected needle-points l l, adapted to readily pierce the fabrics of class above named and hold with the same without liability of being drawn out of shape and in the least from against the said gaging device E, at which the rear edge of such light pieces may be set to before being clamped between the flexible clamping-piece B² and the shaping-blade C. These needle-points operating as fabric-retainers, as do the elastic fabric-retainers G, I prefer to set in a suitable piece L, of wood, which seats into a suitable longitudinal recess or groove L', made in the upper side of the bed-plate A', as shown in Figs. 6 and 7, which piece L' may be retained in place by the dovetail form of side edge walls of the wood piece holding with the dovetail side edge walls of said recess or groove L', as shown in Fig. 7. This movable clamping part B of the machine may be moved down to clamp on the fabric or piece F while in place on the bed-plate B' and the shaping-blade C, as shown in Figs. 5, 7, and 9 and as indicated by dotted lines in Fig. 2, by any suitable mechanism, yet in large machines designed for shaping and trimming pieces composed of several plys of fabric I prefer to employ a suitable draw-rod M, Figs. 1, 2, and 3, which is connected by its lower end to a suitable treadle M' and may be directly connected by its upper end to the top plate B' of the movable clamping part B or to a yoke-piece $M^2$ at its middle of length and through said yoke-piece to said top plate B' by two draw-rods $M^3$ $M^3$, Fig. 1.

In some cases, as in machines adapted to shape and trim light fabrics or pieces of short lengths, there may be employed for closing down part B a lever-form pressing-bar N, having one end, as $n$, Figs. 6, 7, and 8, jointed on a suitable standard N', suitably connected to the bed-plate A', and working in perforation $n'$, provided in stud $N^2$, projected from the upper side of the top plate B' of the movable part B. By this lever-form mechanism an operator may rapidly operate the movable top plate for carrying it from open position (indicated by dotted lines in Fig. 7) to a closed-down and fabric-clamping position. (Shown in the same figure.)

In some cases it may be preferred to trim or shape pieces of considerable length with a line of trim on compound curved lines of edge where each half of the whole line of trim are to be the same as that of the other half. In such a case I employ a shaping-blade C of length a little greater than one-half of the whole length of the piece to be trimmed or shaped, as shown in Fig. 4. With the use of this modification it is to be understood that the piece F to be trimmed will be laid so that a half portion of the length thereof may be set up to the gaging devices E and be clamped between parts A and B and be trimmed. Then the piece F will be turned end for end and the untrimmed half portion will be set up to same gaging devices E and be clamped, as before, between parts A and B and be trimmed, as the first half.

It is to be understood that the line of outer edge $b$ of the flexible clamping-piece $B^2$ of the movable clamping part B of the machine is to be made to be of same shape line of the shaping edge $c$ of the shaping-blade C of the stationary clamping part A of the machine.

P is a long cutting-blade provided with handle P' and adapted to be operated by hand of an operator when grasping said handle, with the cutting-blade pointing upward, as shown in Fig. 9 and indicated by dotted lines in Figs. 5 and 7. This blade is operated by a sudden forward movement of the same in direction of arrow 1, Fig. 9, and with a down-curving movement, as indicated by arrow 2 in the same figure, so as to produce a form of draw-cut beginning at near the lower or handle end of the blade, as at about at point $p$ on the blade when first beginning to cut the fabric or piece F at point P' of the starting end of the cut of the same and carrying the upper portion of the blade rapidly forward and down until nearly the whole length of the blade has been carried with a draw form from a point little below the heel $p^2$ of the blade up to near the point thereof, with its cutting edge $P^3$ moving in contact with the front shaping edge $c$ of the shaping-blade C, so that the said edge may operate as an edge of a shear. At the time the flexible clamping-piece is holding the fabric of the piece F tight and hard down on the upper surface of said shaping-blade a single forward and downward movement of said cutting-blade P will suffice for trimming articles of, say, twelve inches of length, while longer articles may be trimmed by two or more strokes of the said knife.

The trimming or cutting of the fabric effected by this invention will be found to be clean and complete and without being in the least ragged in appearance or drawn or uneven.

Having described my invention, what I claim, and desire to secure by Letters Patent, is—

1. In a machine for shaping and trimming fabric, a suitable bed-plate, a shaping-blade thereon, means to gage the position of the fabric to be trimmed, and a clamping member having an edge to correspond with the edge of the shaping-blade and adapted to clamp the fabric on said shaping-blade.

2. In a machine for shaping and trimming fabric, a bed-plate, a shaping-blade on the marginal edge thereof and having its line of shaping edge in correspondence with that to be given to the piece of fabric to be trimmed, a gaging device adapted to adjustably gage the width of the piece of fabric to be shaped, and a fabric-clamping piece having its outer edge in correspondence with the shaping edge of said shaping-blade and adapted to hold the fabric down onto said shaping-blade.

3. In a machine for shaping and trimming fabric, a bed-plate, a shaping-blade on the marginal edge thereof and having a shaping edge corresponding with that to be given to the fabric, a gaging device, a fabric-retaining device to maintain the fabric on the shaping-blade when properly positioned thereon, and a fabric-clamping member adapted to hold the fabric on said shaping-blade, said clamping member having an edge in correspondence with the edge of said shaping-blade.

4. In a machine for shaping and trimming fabric, a stationary bed-plate, a shaping-blade having an edge in correspondence with that to be given the fabric, a width-gaging device secured on said bed-plate in rear of the shaping-blade, a movable member adapted to be moved to and from said bed-plate, and a clamping-piece secured to said movable member, and having an edge corresponding with the shaping edge of the shaping-blade and adapted to register therewith when the movable member is moved downward to clamp the fabric between the shaping-blades and said clamping-piece.

5. In a machine for shaping and trimming fabric, a stationary bed-plate, a shaping-blade secured thereto, a fabric-retaining device supported from said bed-plate and adapted to normally hold the fabric on the shaping-blade, a movable member pivotally connected with the bed-plate and normally maintained in elevated position, a clamping-piece secured to said movable member and adapted to coact with the shaping-blade to clamp the fabric, and means to move said movable member into clamping position with relation to the bed-plate.

6. In a machine for shaping and trimming fabric, a stationary bed-plate, a shaping-blade secured thereto and having an edge in correspondence with that to be given the fabric, gaging devices adapted to determine the proper position of the fabric, a fabric-retaining device adapted to normally hold the fabric on the shaping-blade, a top plate pivotally connected at its rear edge with the bed-plate and normally held in elevated position, a clamping-piece carried by the top plate and having an edge corresponding to the operative edge of the shaping-blade, and means to move said top plate into clamping relation with the bed-plate.

7. In a machine for shaping and trimming fabric, a stationary bed-plate, a movable top plate pivotally connected with the bed-plate and normally maintained in elevated position, a shaping-blade secured on the bed-plate, a clamping-piece secured on the movable plate, means to move the top plate toward the bed to bring into clamping position the shaping-blade and clamping-piece, the registering edges of which shaping-blade and clamping-piece are shaped to correspond with that to be given the fabric, adjustable gages for properly positioning the fabric in the machine, and fabric-retaining devices for normally holding the fabric on the shaping-blade prior to the coöperative conjunction of the clamping-piece.

HENRY BRYCE.

Witnesses:
ALEX. SELKIRK,
A. SELKIRK, Jr.